(12) United States Patent
Ma et al.

(10) Patent No.: US 12,085,218 B2
(45) Date of Patent: Sep. 10, 2024

(54) FIXED QUICK-RELEASE APPARATUS

(71) Applicant: Guangdong Shuowei Technology Co., Ltd., Dongguan (CN)

(72) Inventors: Wenhong Ma, Dongguan (CN); Lei Luo, Dongguan (CN); Hui Xia, Dongguan (CN); Cheng Chen, Dongguan (CN)

( * ) Notice: Subject to any disclaimer, the term of this patent is extended or adjusted under 35 U.S.C. 154(b) by 0 days.

(21) Appl. No.: 18/531,984

(22) Filed: Dec. 7, 2023

(65) Prior Publication Data

US 2024/0175539 A1 May 30, 2024

(51) Int. Cl.
*A47F 5/025* (2006.01)
*F16M 11/04* (2006.01)

(52) U.S. Cl.
CPC ............ *F16M 11/041* (2013.01); *A47F 5/025* (2013.01)

(58) Field of Classification Search
CPC ......... A47B 11/00; A47F 5/025; A47F 5/0087
USPC ...... 248/346.01, 349.1; 108/20–22, 139, 142
See application file for complete search history.

(56) References Cited

U.S. PATENT DOCUMENTS

| | | | | |
|---|---|---|---|---|
| 7,252,350 B2 * | 8/2007 | Chen | .................... | A47B 91/005 312/351.3 |
| 7,614,595 B2 * | 11/2009 | Richter | ............... | B60R 11/0241 379/446 |
| 7,677,517 B2 * | 3/2010 | Suzuki | .................... | F16M 11/08 248/922 |
| 8,157,237 B2 * | 4/2012 | Sawai | ................ | F16M 11/2014 361/679.21 |
| 11,781,706 B2 * | 10/2023 | Lee | ..................... | F16M 11/2014 248/349.1 |
| 2005/0194509 A1 * | 9/2005 | Tsai | ........................ | A47B 49/00 248/349.1 |
| 2008/0251675 A1 * | 10/2008 | Amato | ................... | F16M 13/00 248/349.1 |

* cited by examiner

*Primary Examiner* — Alfred J Wujciak
(74) *Attorney, Agent, or Firm* — Daniel M. Cohn; Howard M. Cohn

(57) ABSTRACT

The present disclosure discloses a fixed quick-release apparatus. It includes: a gear turntable, configured to connect a cycling bracket, where a limiting gear ring is disposed on a top circle of the gear turntable; a housing, configured to mount the gear turntable; and a gear stand, mounted inside the housing, where a positioning gear ring that is opposite to the limiting gear ring is disposed on a bottom circle of the gear stand, an anti-rotation plate is disposed at a top of the gear stand, and a limiting spring, disposed at a bottom of the gear stand. Because the gear stand is driven to move by pressing the button, the positioning gear ring is engaged with the limiting gear ring, to limit rotation of the locking turntable and the unlocking of the anti-rotation plate on the terminal device. Because the spring steel beads abut against the arc-shaped groove, the terminal device can be adjusted and positioned by rotating 360°.

10 Claims, 13 Drawing Sheets

FIXED QUICK-RELEASE APPARATUS

TECHNICAL FIELD

The present disclosure relates to the technical field of accessories for an electronic product, in particular to a fixed quick-release apparatus.

BACKGROUND

A quick-release apparatus, also known as a quick-release bracket, is mainly used to fasten electronic products such as a mobile phone and a tablet computer to a cycling device by using a cycling bracket. This is convenient for a user to use a terminal device in a driving process. However, an existing quick-release apparatus has the following shortcomings in use:

The existing quick-release apparatus has a single structure, and is mostly connected magnetically. Therefore, a magnetic force is small and interference with the terminal device is less. However, magnetic stability is poor. Especially, when being applied to the cycling device, the existing quick-release apparatus is easy to fall off while being shaken. Due to a large magnetic force, an electromagnetic signal of the terminal device is interfered. In addition, an iron-containing part inside the mobile phone may be magnetized. Another quick-release apparatus is connected to the terminal device in a snap-fit manner. However, a structure is simple, with poor protection. Therefore, the quick-release apparatus is easy to fall off, thus causing damage to the device of the user.

SUMMARY

To achieve the above objective, the present disclosure provides the following technical solutions: A fixed quick-release apparatus includes:
  a gear turntable, configured to connect a cycling bracket, where a limiting gear ring is disposed on a top circle of the gear turntable;
  a housing, configured to mount the gear turntable;
  a gear stand, mounted inside the housing, where a positioning gear ring that is opposite to the limiting gear ring is disposed on a bottom circle of the gear stand, and an anti-rotation plate is disposed at a top of the gear stand;
  a limiting spring, disposed at a bottom of the gear stand, and configured to control a clearance between the positioning gear ring and the limiting gear ring, to enable the positioning gear ring to rotate 360° relative to the limiting gear ring;
  a lower housing, embedded in a bottom of the housing;
  a locking turntable, configured to connect a terminal device, where
  a top end of the anti-rotation plate penetrates the lower housing and extends to a side of the locking turntable, to limit relative rotation between the locking turntable and the terminal device; and
  at least two buttons, where one end of the button extends inside the housing and is in contact with the top of the gear stand, and the button is pressed to abut against the gear stand, to enable the positioning gear ring to be engaged with the limiting gear ring, and in addition, the top end of the anti-rotation plate retracts inside the lower housing while the gear stand moves.

As a preferred technical solution of the present disclosure, a connection base is disposed inside the gear turntable, at least four spring steel beads are disposed inside the connection base, a bottom of the lower housing is provided with a circle of arc-shaped groove, the arc-shaped groove, the gear turntable, the gear stand, and the locking turntable are coaxially disposed, and one end of the spring steel bead abuts against an inner wall of the arc-shaped groove.

As a preferred technical solution of the present disclosure, two buckles that are mutually symmetrical protrude from an outer ring of the locking turntable, the anti-rotation plate is located on a rotating path of the buckle, the anti-rotation plate is arc-shaped, and a damping ring is disposed at a top of the locking turntable.

As a preferred technical solution of the present disclosure, a diameter of the gear stand is larger than a diameter of the gear turntable, at least one connecting column is disposed at a circle of the gear stand, a quantity of limiting springs is not less than one, and the plurality of limiting springs are respectively sleeved on a plurality of connecting columns, a limiting groove is disposed at a bottom of an inner wall of the housing, and one end, away from the connecting column, of the limiting spring extends inside the limiting groove.

As a preferred technical solution of the present disclosure, a movable groove and a beveled edge portion are respectively disposed at a top and a bottom of one end, extending inside the housing, of the button, a slant block that is in contact with the beveled edge portion is disposed at the top of the gear stand, and the beveled edge portion is internally provided with a kidney-shaped hole, and a screw of which one end is screwed inside the lower housing is disposed inside the kidney-shaped hole.

As a preferred technical solution of the present disclosure, a return spring is movably sleeved inside the movable groove, a limiting base is disposed on the bottom of the inner wall of the housing, and one end, away from the movable groove, of the return spring extends inside the limiting base.

As a preferred technical solution of the present disclosure, two arc-shaped stabilizing plates are symmetrically disposed at a bottom of the lower housing, and bottom ends of the arc-shaped stabilizing plates extend inside the gear stand.

As a preferred technical solution of the present disclosure, a nut is embedded inside the connection base, an assembly groove is provided at a bottom of the gear turntable, and a through hole that is coaxially opposite to the nut is provided in the assembly groove.

As a preferred technical solution of the present disclosure, a stud I that is located between two arc-shaped stabilizing plates is disposed at a bottom of the lower housing, a stud II that extends inside of the stud I is disposed at a bottom of the locking turntable, and a turntable locking screw of which one end is screwed into the stud II is disposed inside the stud I.

As a preferred technical solution of the present disclosure, a limiting cardboard that is located on two sides of the stud II is disposed at a bottom of the locking turntable, a bottom end of the limiting cardboard is stuck inside the lower housing, and at least one anti-slip strip is disposed at a bottom of the buckle.

Compared with the prior art, the present disclosure provides a fixed quick-release apparatus. The fixed quick-release device has the following beneficial effect:
  1. According to the fixed quick-release apparatus, the locking turntable is connected to the terminal device in a rotary snap-fit manner, and the terminal device that is connected in the rotary snap-fit manner is further limited by using the anti-rotation plate. In comparison with a single snap-fit manner and a magnetic fixation manner, the terminal device is fastened by using the anti-rotation plate with the locking turntable. Therefore, the terminal device is more stable and better protected in use, and does not fall off.

2. According to the fixed quick-release apparatus, because the gear stand is driven to move by pressing the button, the positioning gear ring is engaged with the limiting gear ring, to limit rotation of the locking turntable and the unlocking of the anti-rotation plate on the terminal device. Therefore, the product can be quickly mounted and disassembled. Because the spring steel beads abut against the arc-shaped groove, the terminal device can be adjusted and positioned by rotating 360°. Therefore, a user can adjust a placement angle of the terminal device in different scenarios. This better meets a use requirement of the user.

Figure 1:
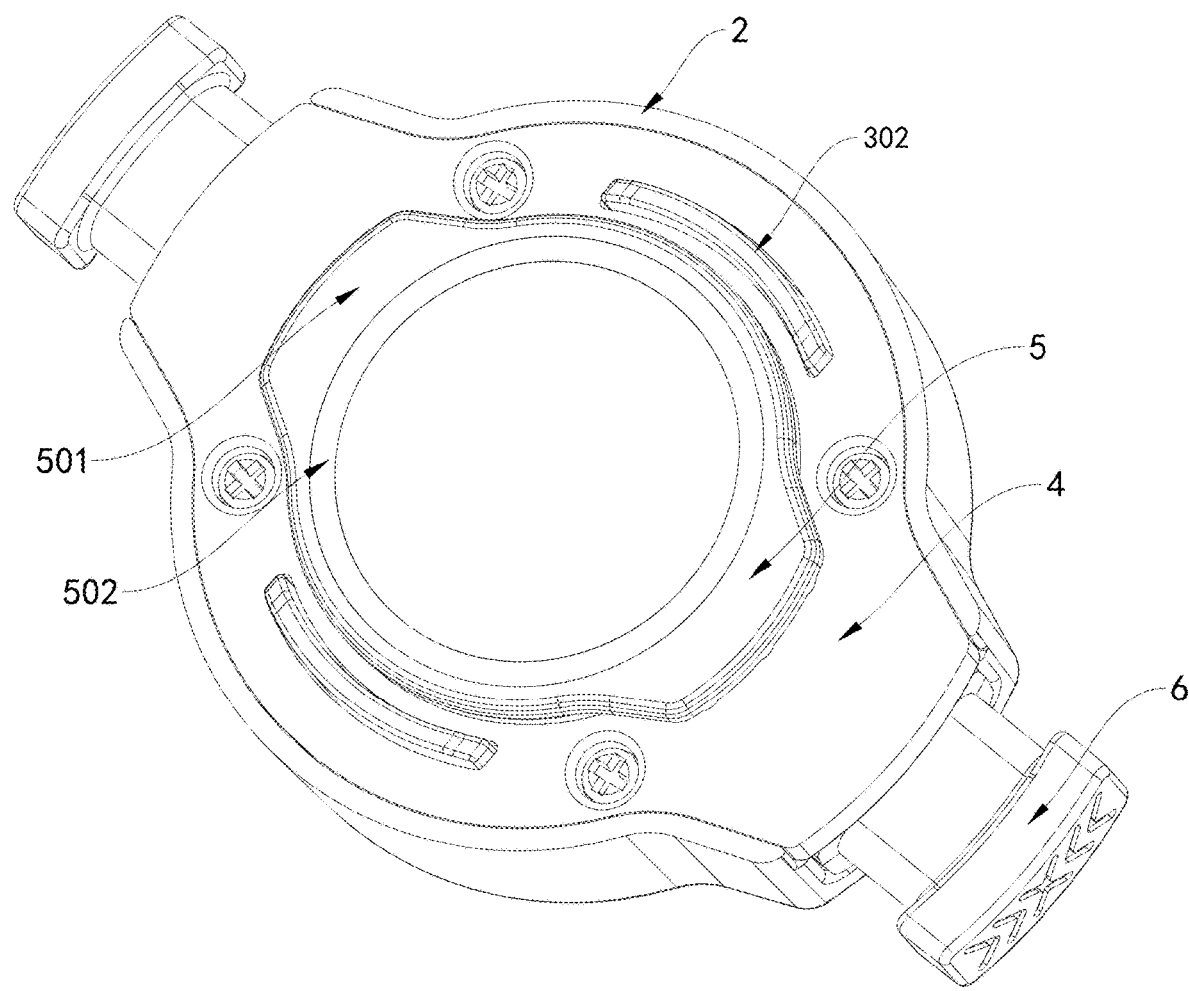
FIG. 1 is a schematic diagram of a structure of a fixed quick-release apparatus provided in the present disclosure.
Figure 2:
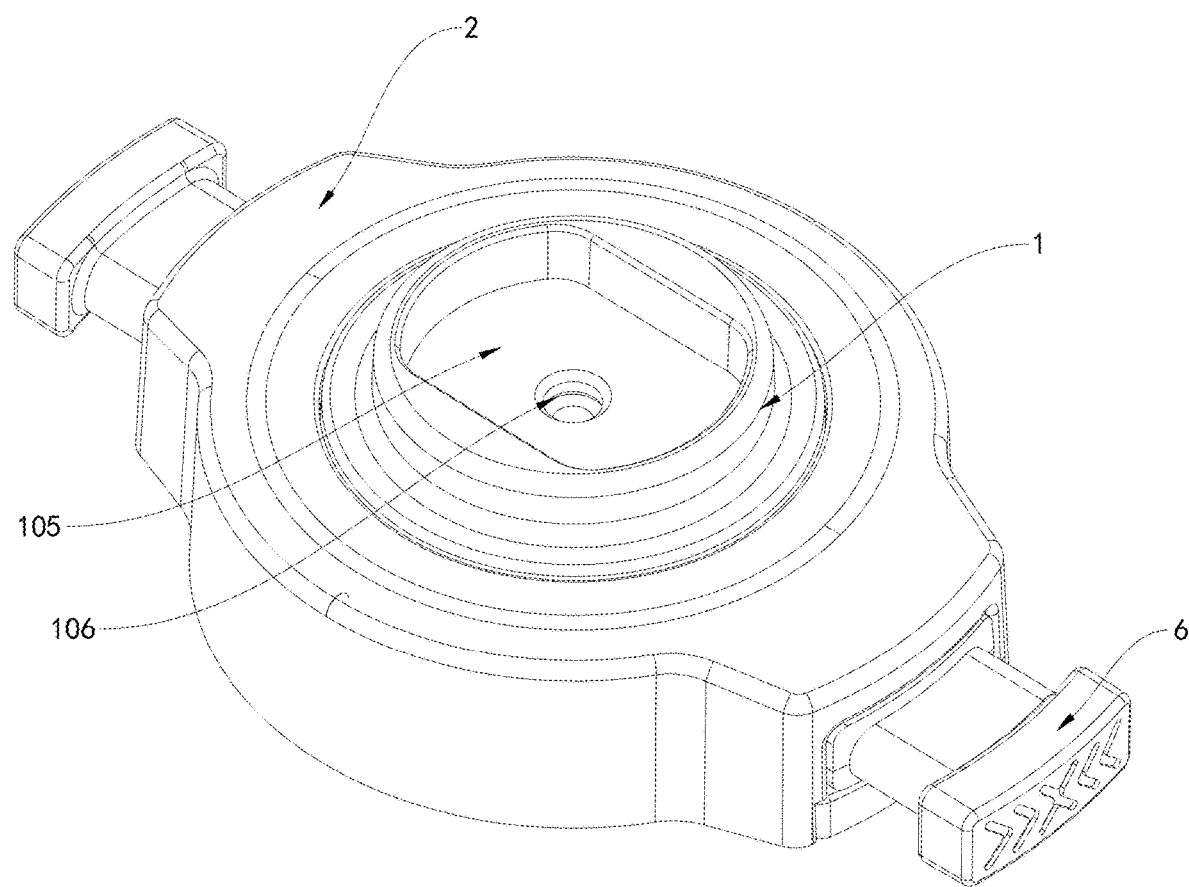
FIG. 2 is a schematic diagram of a structure of a gear turntable of a fixed quick-release apparatus provided in the present disclosure.

Reference numerals: 1. gear turntable; 101. limiting gear ring; 102. connection base; 103. spring steel beads; 104. nut; 105. assembly groove; 106. through hole; 2. housing; 201. limiting groove; 202. limiting base; 3. gear stand; 301. positioning gear ring; 302. anti-rotation plate; 303. limiting spring; 304. connecting column; 305. slant block; 4. lower housing; 401. arc-shaped groove; 402. arc-shaped stabilizing plates; 403. stud I; 404. locking screw; 5. locking turntable; 501. buckle; 502. damping ring; 503. stud II; 504. limiting cardboard; 505. anti-slip strip; 6. buttons; 601. movable groove; 602. beveled edge portion; 603. return spring; 7. kidney-shaped hole; 8. screw.

DETAILED DESCRIPTION OF EMBODIMENTS

The technical solutions in embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on embodiments of the present disclosure without creative efforts should fall within the protection scope of the present disclosure.

Refer to FIG. 1 to FIG. 13. A fixed quick-release apparatus includes: a gear turntable 1, configured to connect a cycling bracket, where a limiting gear ring 101 is disposed on a top circle of the gear turntable 1; a housing 2, configured to mount the gear turntable 1; a gear stand 3, mounted inside the housing 2, where a positioning gear ring 301 that is opposite to the limiting gear ring 101 is disposed on a bottom circle of the gear stand 3, and an anti-rotation plate 302 is disposed at a top of the gear stand 3;

a limiting spring 303, disposed at a bottom of the gear stand 3, and configured to control a clearance between the positioning gear ring 301 and the limiting gear ring 101, to enable the positioning gear ring 301 to rotate 360° relative to the limiting gear ring 101; a lower housing 4, embedded in a bottom of the housing 2; a locking turntable 5, configured to connect a terminal device, where a top end of the anti-rotation plate 302 penetrates the lower housing 4 and extends to a side of the locking turntable 5, to limit relative rotation between the locking turntable 5 and the terminal device, after the gear turntable 1 is connected to the cycling bracket, the gear turntable 1 does not rotate, and the housing 2, the gear stand 3, the lower housing 4, and the locking turntable 5 form an integral whole, to enable the housing 2, the gear stand 3, the lower housing 4, and the locking turntable 5 to drive the terminal device to rotate by 360° on the gear turntable 1, and therefore, a requirement of a user for using the terminal device at different angles in a plurality of scenarios can be met; and at least two buttons 6, where one end of the button 6 extends inside the housing 2 and is in contact with the top of the gear stand 3, and the button 6 is pressed to abut against the gear stand 3, to enable the positioning gear ring 301 to be engaged with the limiting gear ring 101, and in addition, the top end of the anti-rotation plate 302 retracts inside the lower housing 4 while the gear stand 3 moves. A housing that matches the locking turntable 5 needs to be mounted on the terminal device, and the housing is provided with a groove that matches the locking turntable 5. when the terminal device is connected, the housing is sleeved on the terminal device, and the groove is aligned with the buckles 501 that are disposed on the two sides of the locking turntable 5, to enable the buckles 501 to be inserted inside the groove. The terminal device is rotated, to enable the buckles 501 to be staggered with the groove, to complete the snap-fit. When the buckles 501 are staggered with the groove, the anti-rotation plate 302 and the buckles 501 are opposite to each other and inserted, to prevent the terminal device from rotating on the locking plate. This ensures stability of the connection of the terminal device.

As a specific technical solution in this embodiment, a connection base 102 is disposed inside the gear turntable 1, at least four spring steel beads 103 are disposed inside the connection base 102, a bottom of the lower housing 4 is provided with a circle of arc-shaped groove 401, the arc-shaped groove 401, the gear turntable 1, the gear stand 3, and the locking turntable 5 are coaxially disposed, and one end of the spring steel bead 103 abuts against an inner wall of the arc-shaped groove 401. As shown in FIG. 6, FIG. 8, FIG. 9, and FIG. 12, the spring steel beads 103 continuously abut against the arc-shaped groove 401 through an elastic force, to increase resistance while the locking turntable 5 rotates, to enable an angle of the terminal device adjusted by the user not to be easily changed by shaking. Therefore, the terminal device is more stable while being used. Due to the four spring steel beads 103, the clearance between the gear turntable 1 and the lower housing 4 is more smoothly controlled.

Figure 3:
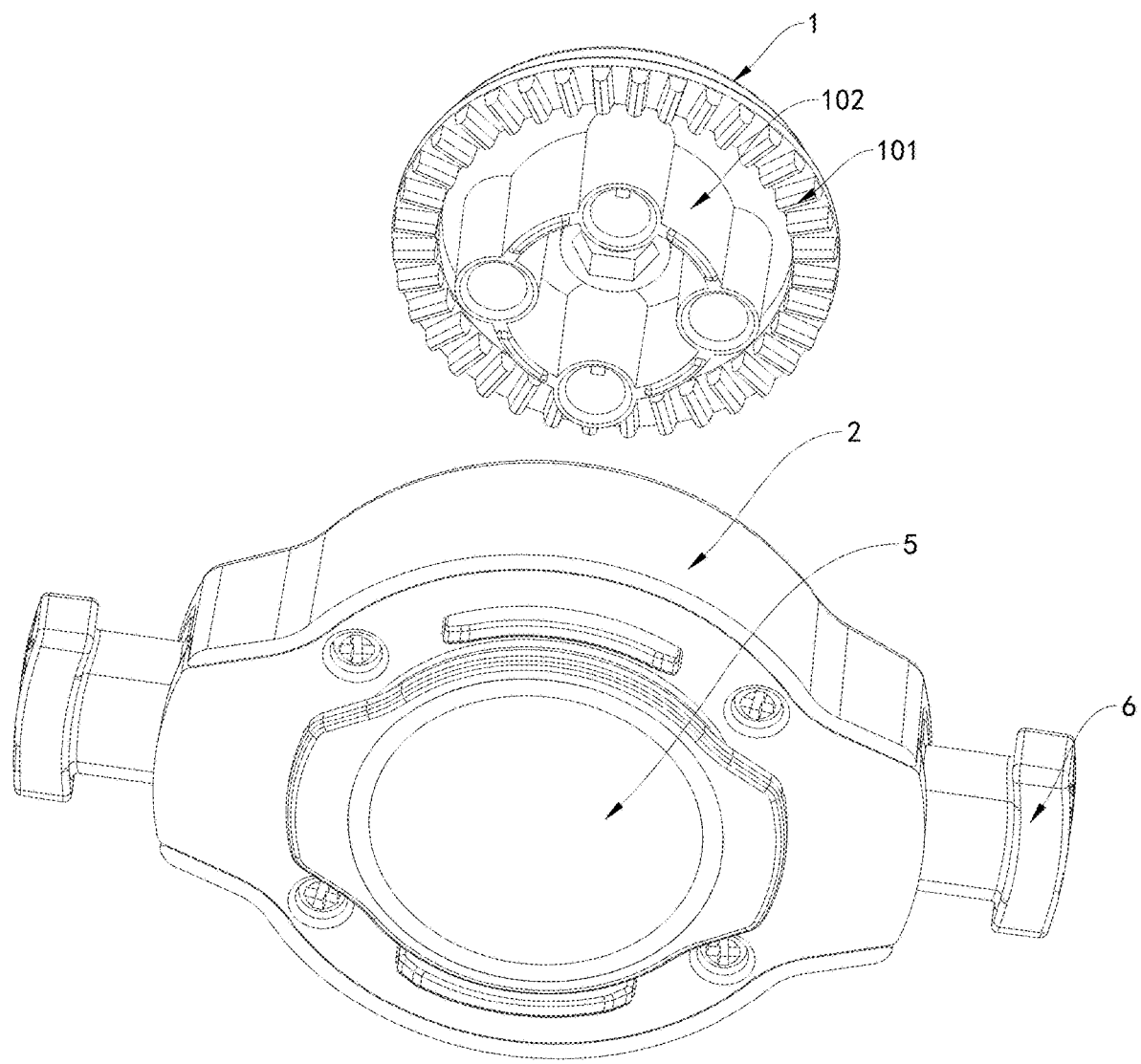
FIG. 3 is a schematic diagram of a structure of a limiting gear ring of a fixed quick-release apparatus provided in the present disclosure.
Figure 4:
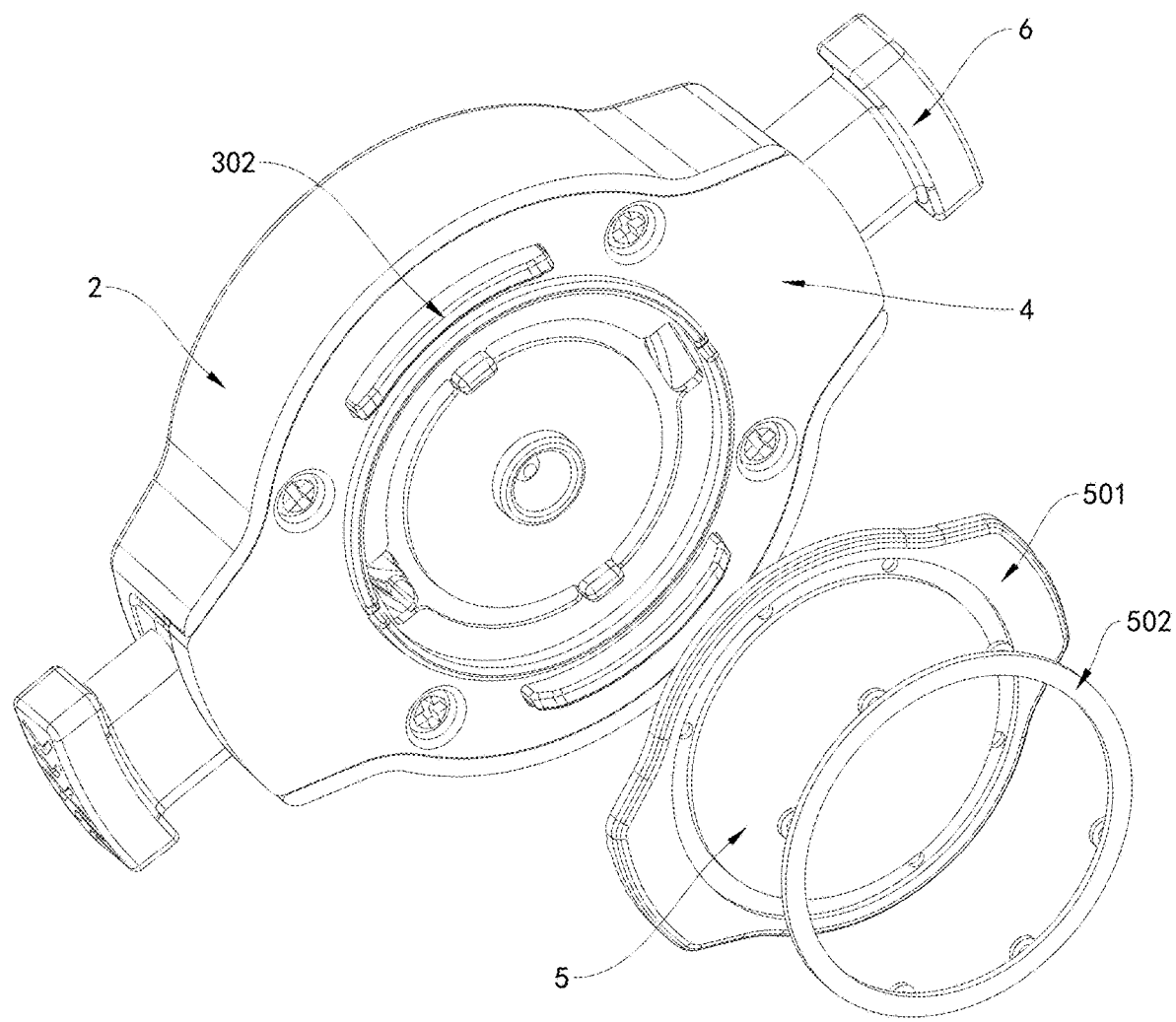
FIG. 4 is a schematic diagram of a structure of a lower housing of a fixed quick-release apparatus provided in the present disclosure.
Figure 5:
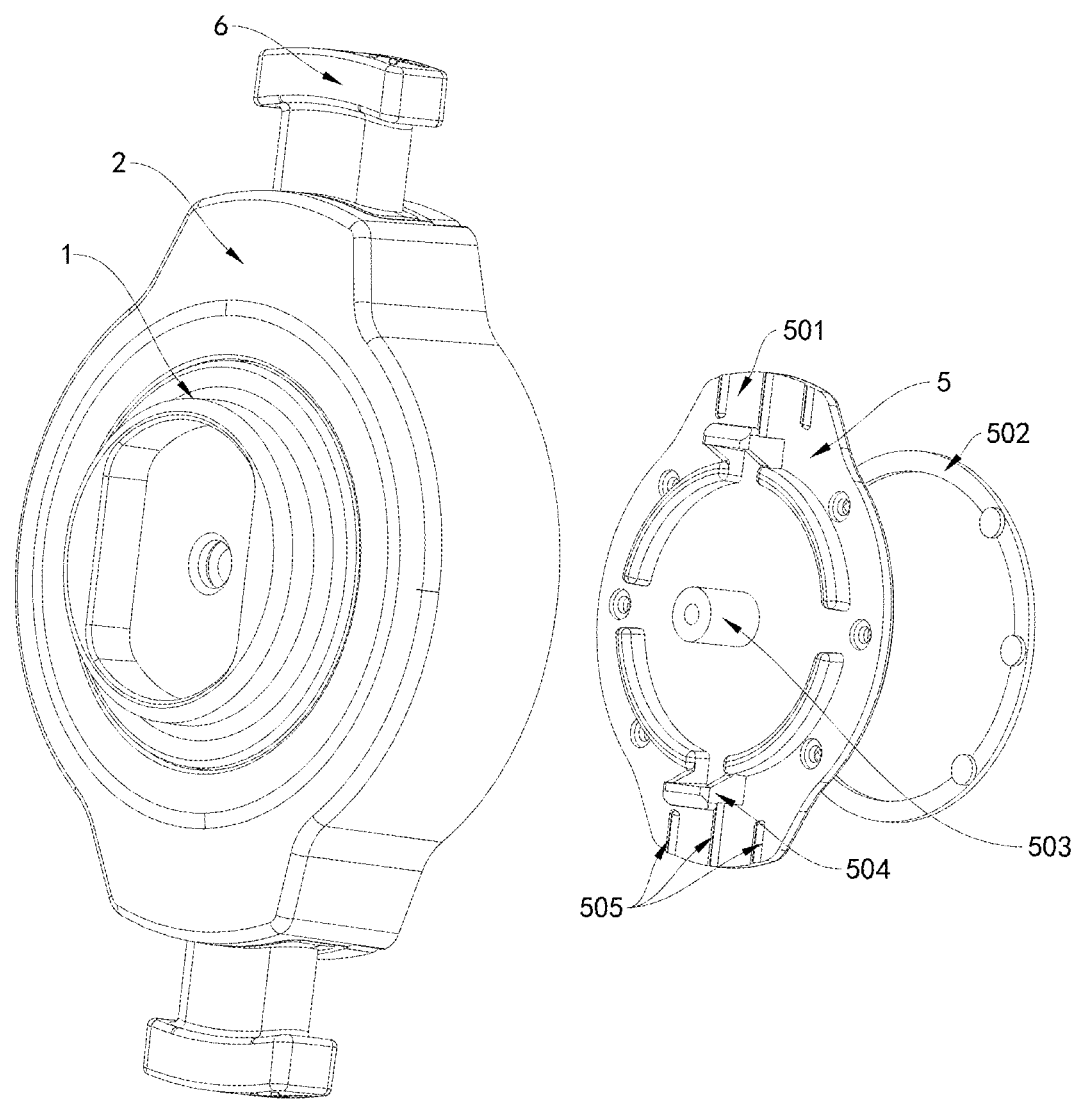
FIG. 5 is a schematic diagram of a structure of a limiting cardboard of a fixed quick-release apparatus provided in the present disclosure.
Figure 11:
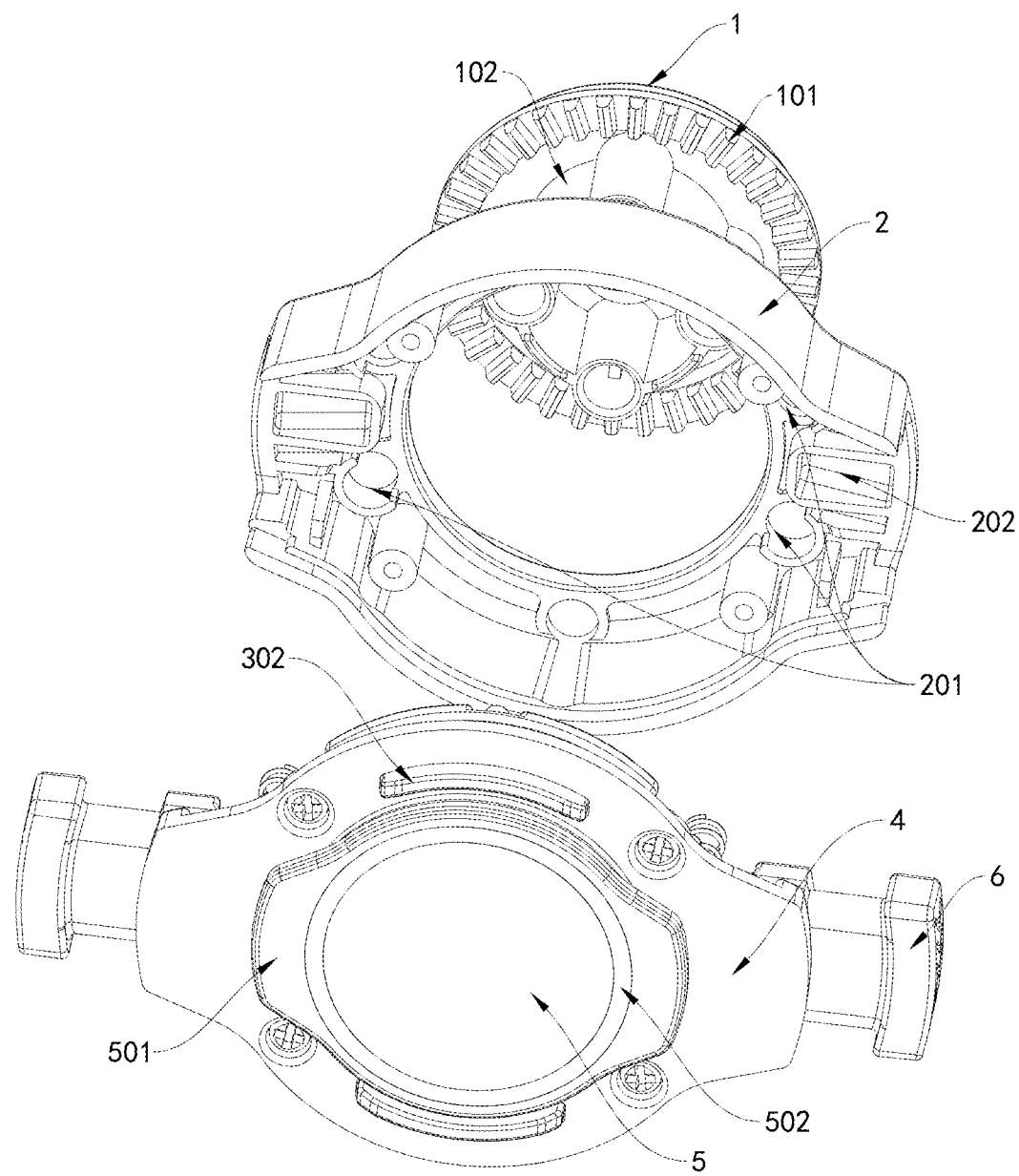
FIG. 11 is a schematic diagram of a structure of an anti-rotation plate of a fixed quick-release apparatus provided in the present disclosure.

As a specific technical solution in this embodiment, two buckles 501 that are mutually symmetrical protrude from an outer ring of the locking turntable 5, the anti-rotation plate 302 is located on a rotating path of the buckle 501, the anti-rotation plate 302 is arc-shaped, and a damping ring 502 is disposed at a top of the locking turntable 5. As shown in FIG. 1, FIG. 3, and FIG. 11, the anti-rotation plate 302 is located on the rotating path of the buckles 501. When the buckles 501 are docked to the groove on the terminal device, the buttons 6 need to be pressed first, to enable the buttons 6 to abut against the positioning gear ring 301 and to be engaged with the limiting gear ring 101. Therefore, the housing 2, the gear stand 3, the lower housing 4, and the locking turntable 5 are locked with the gear turntable 1, and do not rotate. According to this design, when the terminal device is mounted, the locking turntable 5 does not rotate, to enable the terminal device to be more conveniently and quickly mounted. When the buttons 6 are pressed, the anti-rotation plate 302 synchronously moves while the gear stand 3 moves, to enable the anti-rotation plate 302 to be retracted inside the lower housing 4. Therefore, the rotating path of the buckles 501 is not overshadowed, and rotation of the terminal device is not affected. After the groove on the terminal device is connected to the buckles 501 in the rotary snap-fit manner, when the user releases the buttons 6, the gear stand 3 is reset by rebound of the limiting spring 303, to enable the anti-rotation plate 302 to extend outside the lower housing 4 again. In addition, because the groove on the terminal device is connected to the buckles 501 in the rotary snap-fit manner, the groove after the rotation is opposite to the anti-rotation plate 302. When extending outside the lower housing 4, the anti-rotation plate 302 is directly inserted inside the groove. Therefore, the groove and the terminal device cannot rotate. According to this design, the stability of the connection between the locking turntable 5 and the terminal device is further ensured. Because the damping ring 502 is disposed between the locking turntable 5 and the terminal device, abrasion to the terminal device is reduced.

As a specific technical solution in this embodiment, a diameter of the gear stand 3 is larger than a diameter of the gear turntable 1, at least one connecting column 304 is disposed at a circle of the gear stand 3, a quantity of limiting springs 303 is not less than one, and the plurality of limiting springs 303 are respectively sleeved on a plurality of connecting columns 304, a limiting groove 201 is disposed at a bottom of an inner wall of the housing 2, and one end, away from the connecting column 304, of the limiting spring 303 extends inside the limiting groove 201. When the gear stand 3 gets close to the gear turntable 1 due to abutting of the buttons 6, the gear stand 3 compresses the limiting springs 303. When the buttons 6 do not abut with the gear stand 3, the gear stand 3 can be quickly reset due to the limiting springs 303. This does not affect rotation of the gear stand 3. By disposing of the connecting column 304 and the limiting groove 201, stability of the limiting spring 303 is ensured, without displacement or falling off.

Figure 6:
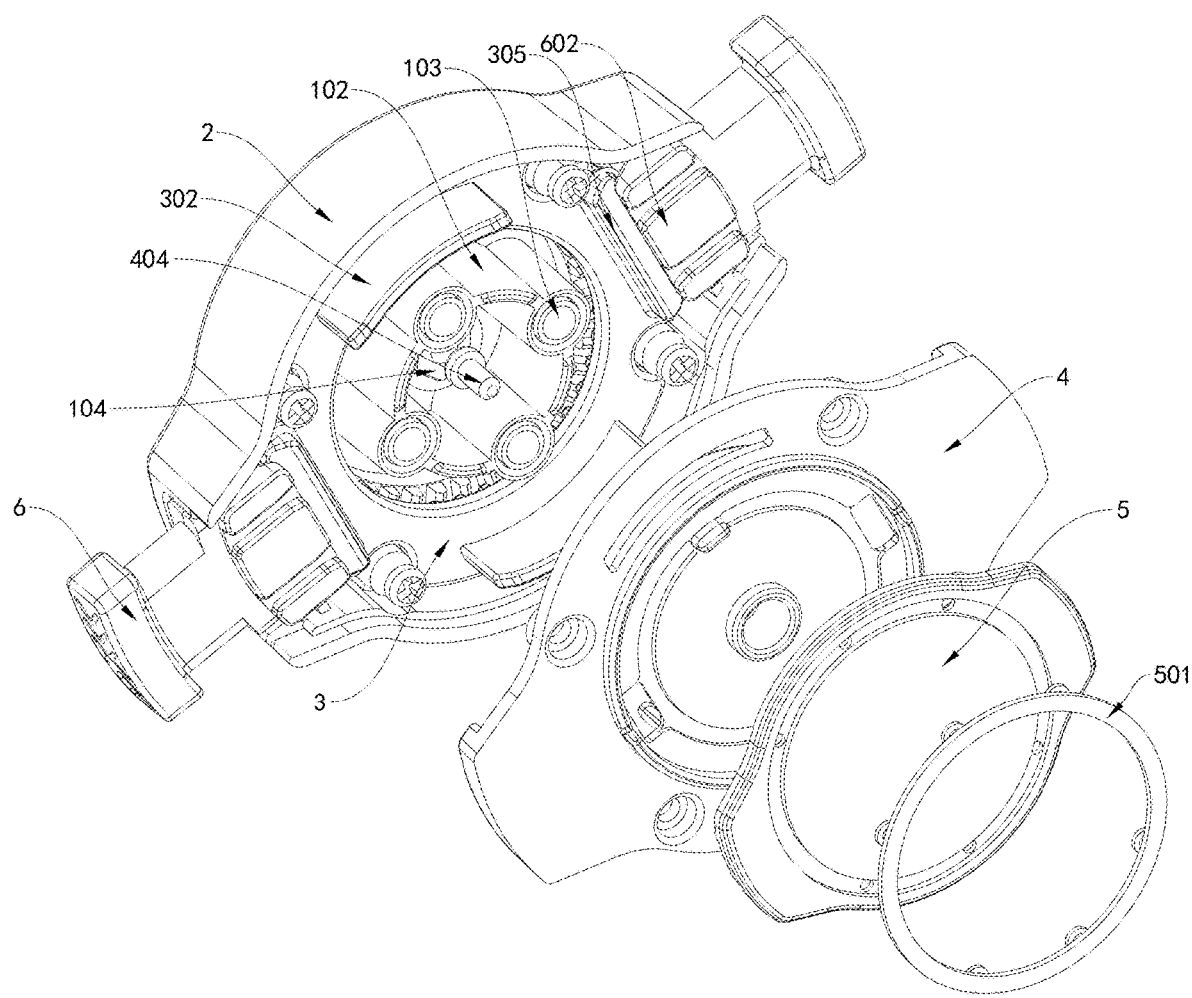
FIG. 6 is a schematic diagram of a structure of spring steel beads of a fixed quick-release apparatus provided in the present disclosure.
Figure 7:
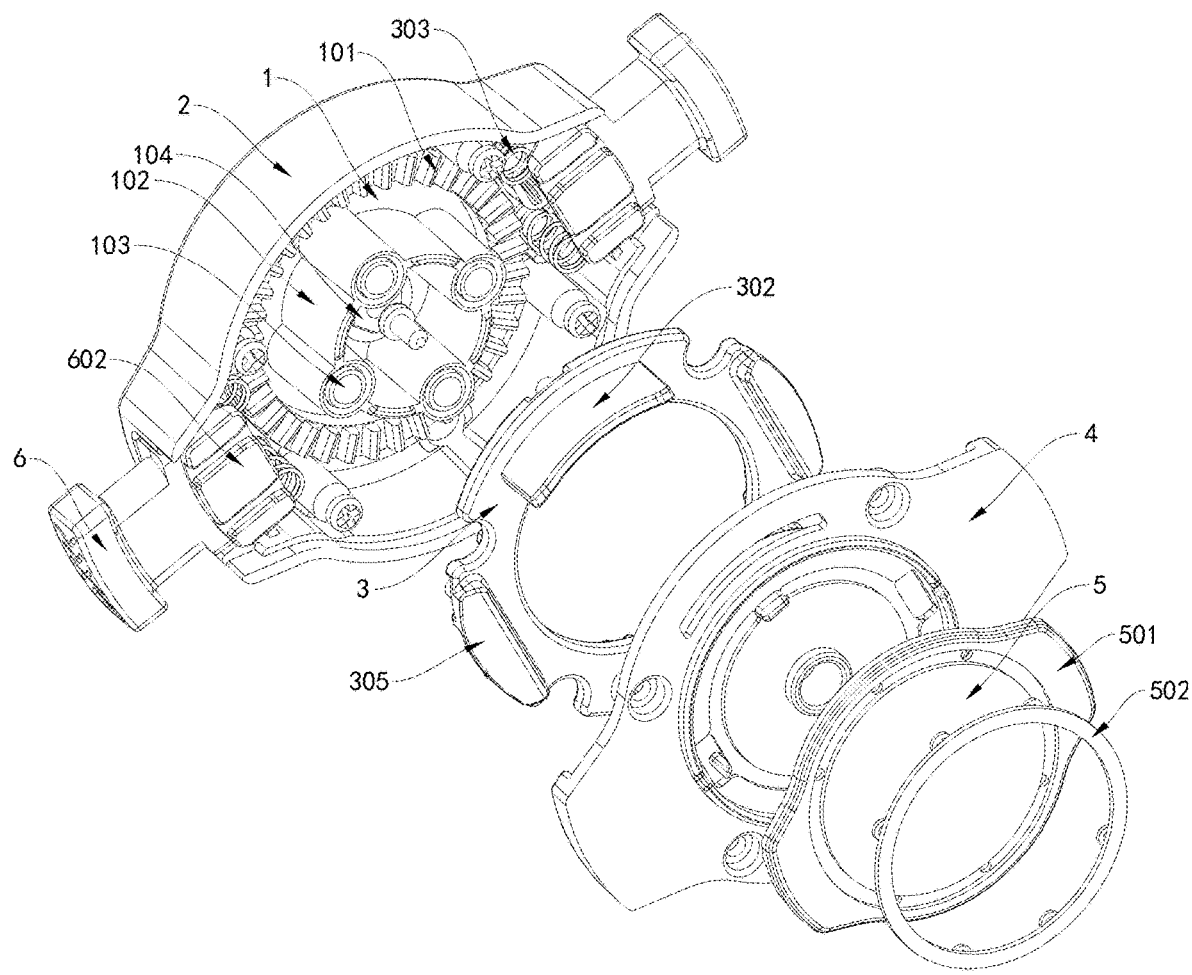
FIG. 7 is a schematic diagram of a structure of a connection base of a fixed quick-release apparatus provided in the present disclosure.
Figure 10:
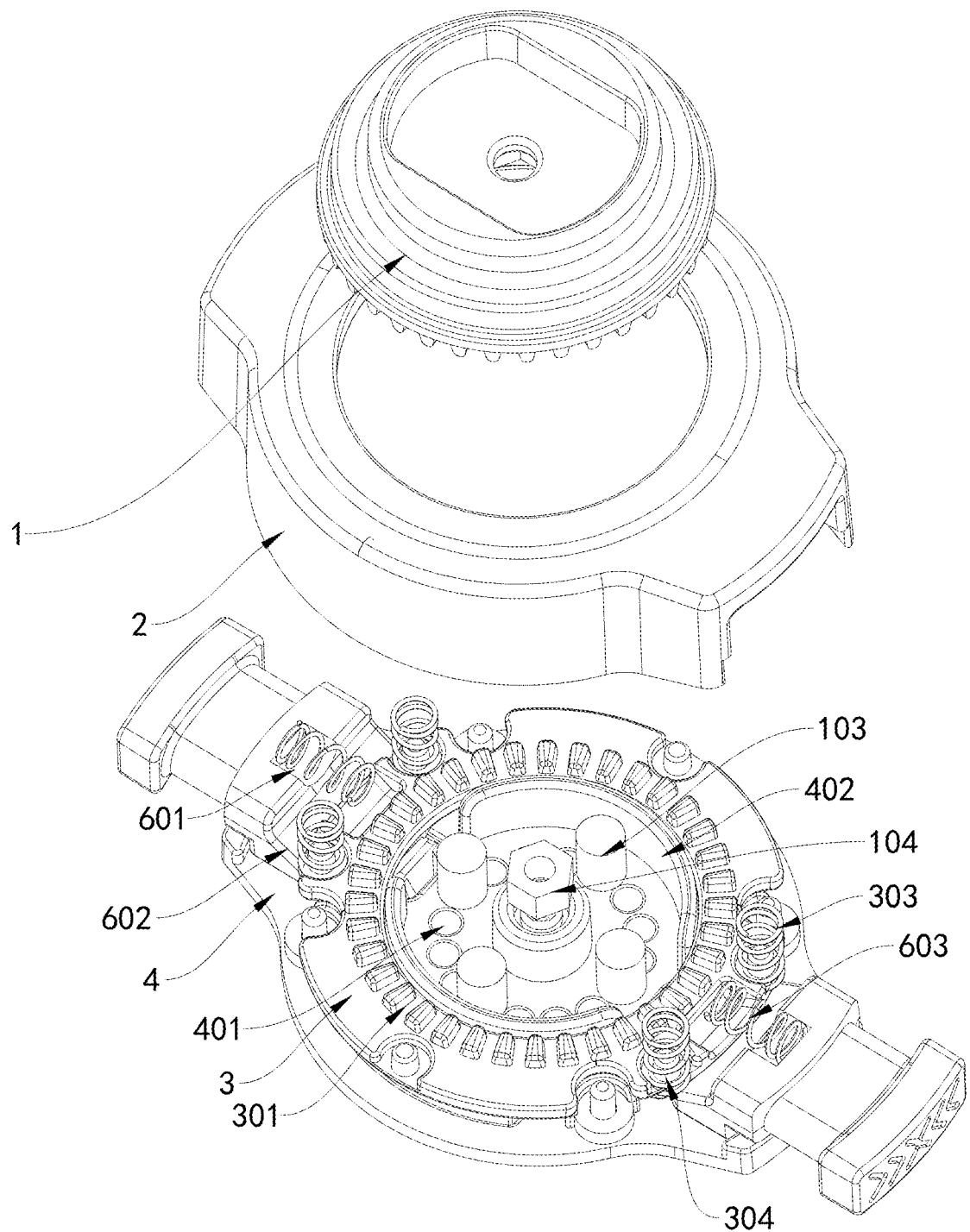
FIG. 10 is a schematic diagram of a structure of buttons of a fixed quick-release apparatus provided in the present disclosure.
Figure 12:
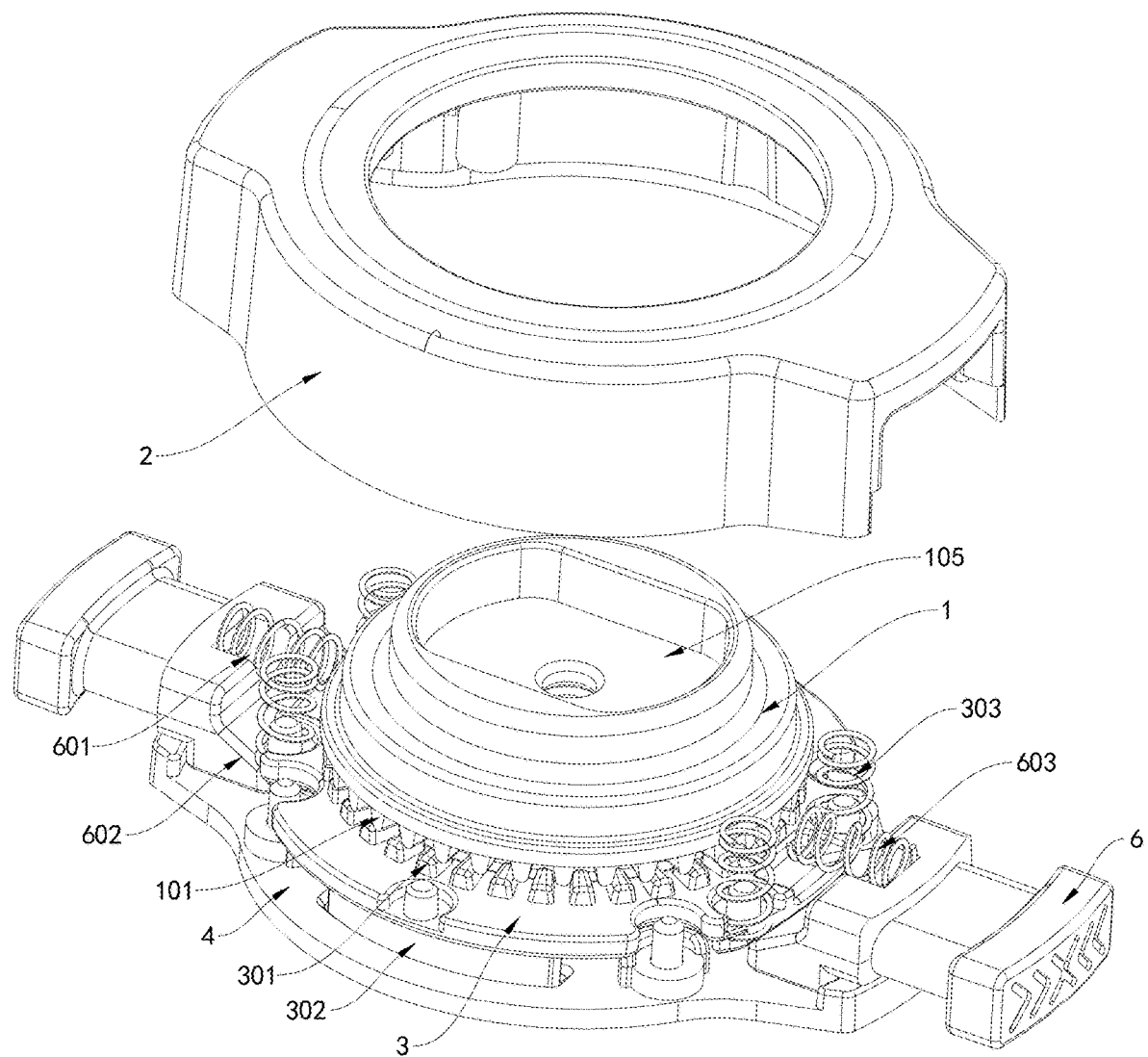
FIG. 12 is a schematic diagram of structures of a gear turntable and a gear stand of a fixed quick-release apparatus provided in the present disclosure.
Figure 13:
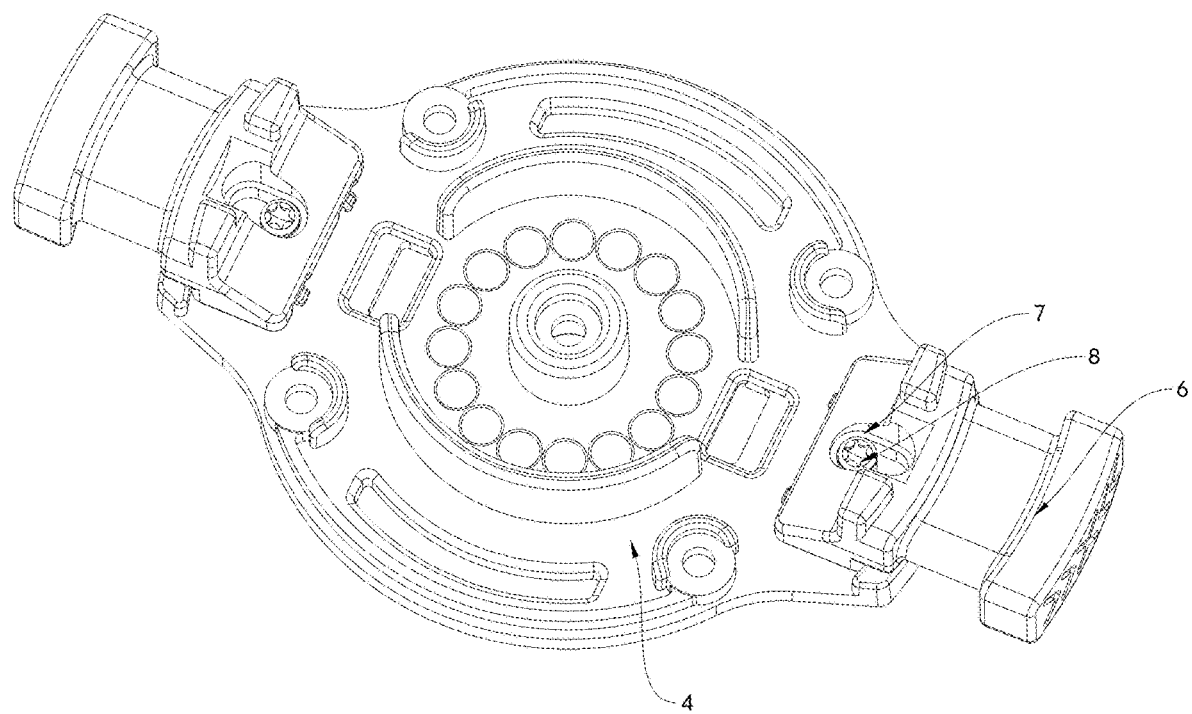
FIG. 13 is a schematic diagram of structures of a kidney-shaped hole and a screw of a fixed quick-release apparatus provided in the present disclosure.

As a specific technical solution in this embodiment, a movable groove 601 and a beveled edge portion 602 are respectively disposed at a top and a bottom of one end, extending inside the housing 2, of the button 6, a slant block 305 that is in contact with the beveled edge portion 602 is disposed at the top of the gear stand 3, and the beveled edge portion 602 is internally provided with a kidney-shaped hole 7, and a screw 8 of which one end is screwed inside the lower housing 4 is disposed inside the kidney-shaped hole 7. When the buttons 6 are pressed, the buttons 6 abut against the slant block 305 through the beveled edge portion 602. As shown in FIG. 6, FIG. 10, and FIG. 12, by disposing of the beveled edge portion 602 and the slant block 305, displacement of the gear stand 3 is easier to trigger, and the buttons 6 are easier to press. The screw 8 is used to limit a sliding distance of the button 6, to ensure that the buttons 6 are more stable when sliding.

As a specific technical solution in this embodiment, a return spring 603 is movably sleeved inside the movable groove 601, a limiting base 202 is disposed on the bottom of the inner wall of the housing 2, and one end, away from the movable groove 601, of the return spring 603 extends inside the limiting base 202. When the buttons 6 are pressed, the buttons 6 compress the return spring 603. By disposing of the return spring 603, when the user releases the buttons 6, the return spring 603 abuts against the buttons 6 through an elastic force and then is quickly reset, so as not to abut against the gear stand 3. Therefore, the positioning gear ring 301 is quickly disengaged from the limiting gear ring 101, and operations are more flexible. Because the return spring 603 is disposed between the movable groove 601 and the limiting base 202, stability of the return spring 603 is ensured.

Figure 9:
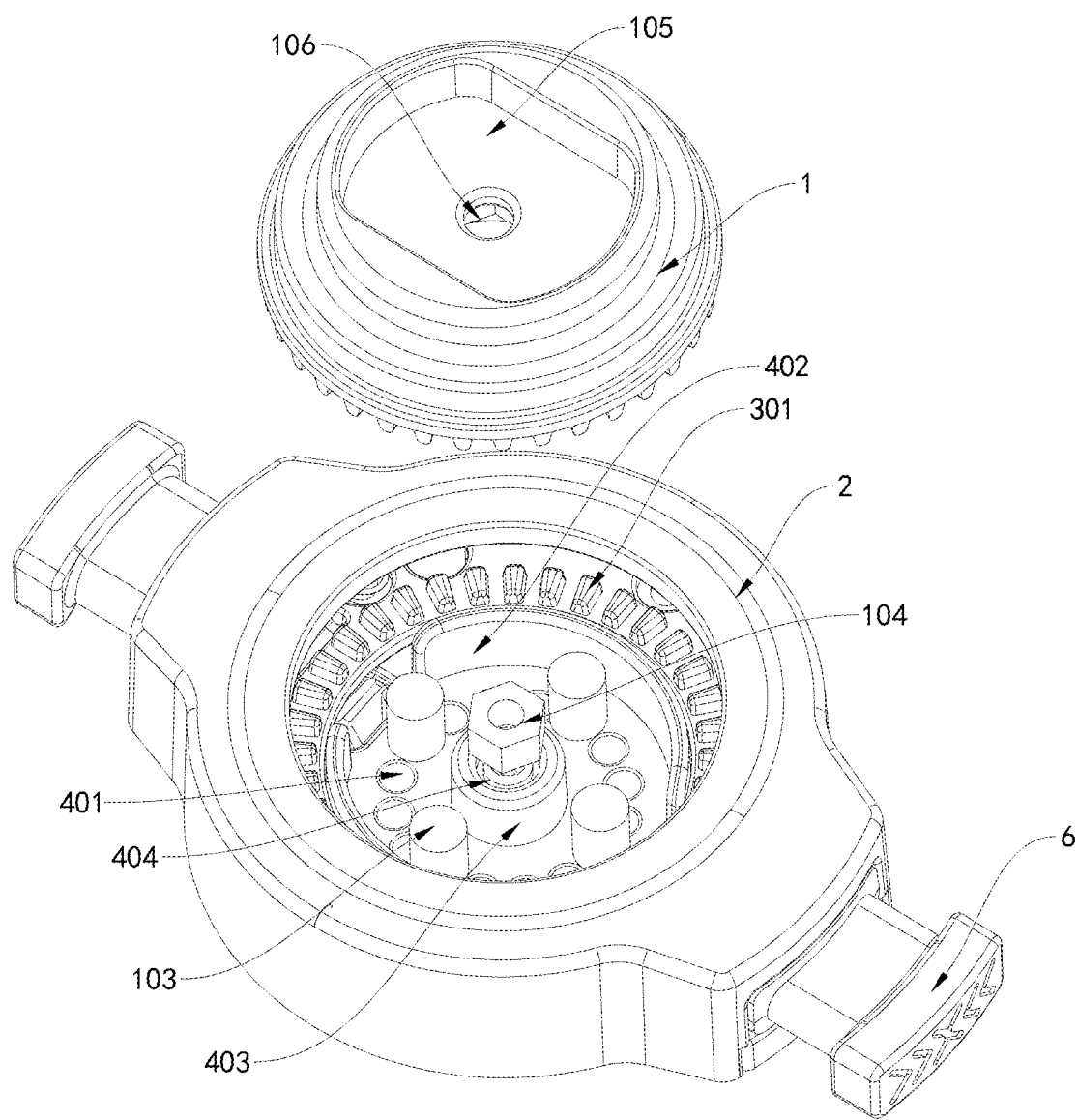
FIG. 9 is a schematic diagram of a structure of a housing of a fixed quick-release apparatus provided in the present disclosure.

As a specific technical solution in this embodiment, two arc-shaped stabilizing plates 402 are symmetrically disposed at a bottom of the lower housing 4, and bottom ends of the arc-shaped stabilizing plates 402 extend inside the gear stand 3. As shown in FIG. 9 and FIG. 10, by disposing of the arc-shaped stabilizing plates 402, stability of connection between the gear stand 3 and the lower housing 4 is ensured.

As a specific technical solution in this embodiment, a nut 104 is embedded inside the connection base 102, an assembly groove 105 is provided at a bottom of the gear turntable 1, and a through hole 106 that is coaxially opposite to the nut 104 is provided in the assembly groove 105. The nut 104 is used to mount the screw of the cycling bracket by matching the through hole 106. The assembly groove 105 is embedded inside the cycling bracket.

As a specific technical solution in this embodiment, a stud I 403 that is located between two arc-shaped stabilizing plates 402 is disposed at a bottom of the lower housing 4, a stud II 503 that extends inside of the stud I 403 is disposed at a bottom of the locking turntable 5, and a turntable locking screw 404 of which one end is screwed into the stud II 503 is disposed inside the stud I 403. The locking turntable 5 is secured to the lower housing 4 through the locking screw 404.

Figure 8:
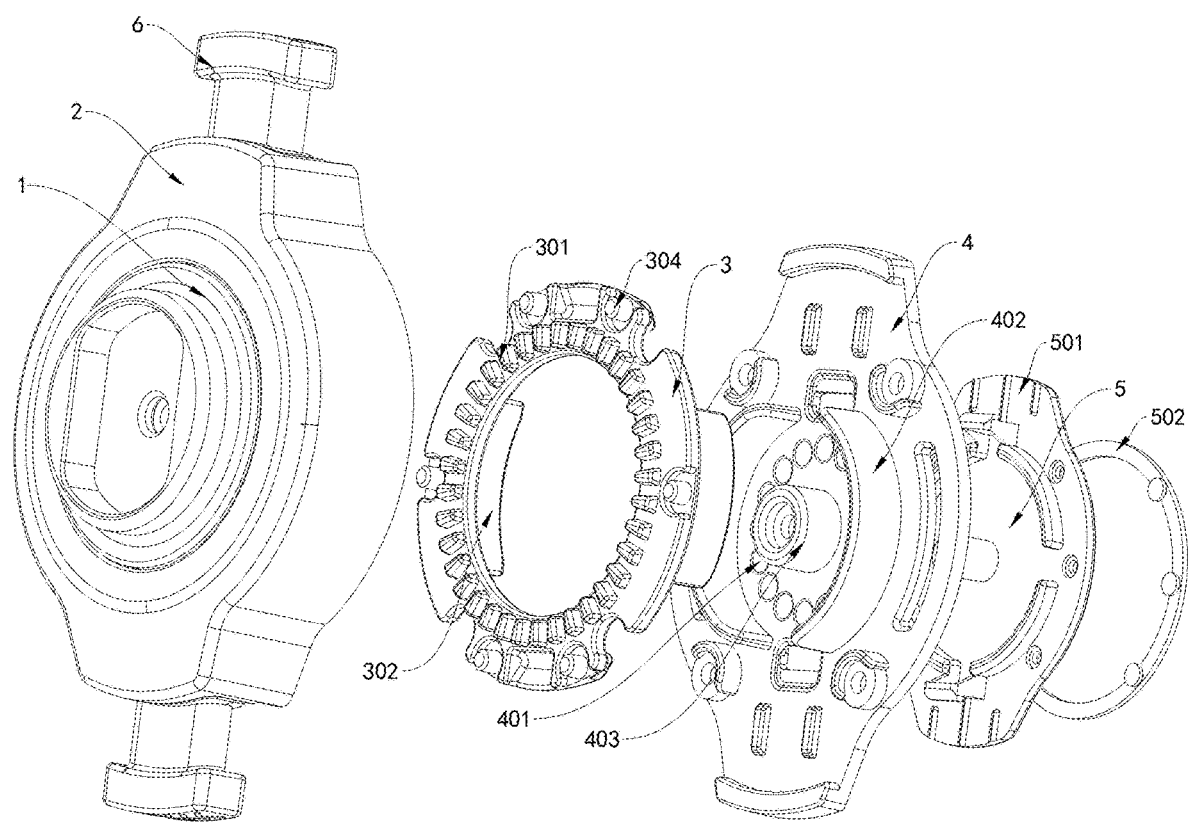
FIG. 8 is a schematic diagram of a structure of a gear stand of a fixed quick-release apparatus provided in the present disclosure.

As a specific technical solution in this embodiment, a limiting cardboard 504 that is located on two sides of the stud II 503 is disposed at a bottom of the locking turntable 5, a bottom end of the limiting cardboard 504 is stuck inside the lower housing 4, and at least one anti-slip strip 505 is disposed at a bottom of the buckle 501. By disposing of the limiting cardboard 504, the locking turntable 5 does not rotate relative to the lower housing 4. This ensures stability of connection of the locking turntable 5. By disposing of the anti-slip strip 505, the buckles 501 are more stable when being connected to the groove on the terminal device in the snap-fit manner. As shown in FIG. 8, by disposing of the anti-slip strip 505, resistance is increased when the buckles 501 abut against the inner wall of the groove. This reduces sliding and improves stability.

In use, the housing with the locking turntable 5 is first mounted on the terminal device, the housing is provided with the groove that matches the locking turntable 5, and the cycling bracket is connected through the nut 104 and the assembly groove 105, to mount the cycling bracket on a cycling device, and then connect the terminal device. To avoid rotation of the locking turntable 5 when the terminal device is mounted, the buttons 6 need to be pressed first. The buttons 6 compress the return spring 603, and abut against the slant block 305 through the beveled edge portion 602, and the slant block 305 drives the gear stand 3 to compress the limiting spring 303 and gets close to the gear turntable 1, to enable the positioning gear ring 301 to be engaged with the limiting gear ring 101. Therefore, the locking turntable 5, the lower housing 4, the gear stand 3, the housing 2, and the gear turntable 1 do not rotate. In addition, when the user presses the buttons 6, the anti-rotation plate 302 retracts inside the lower housing 4 with the gear stand 3, and detaches from a side of the locking turntable 5. This does not affect the rotational docking of the groove and the buckles 501. The groove on the housing is aligned with the buckles 501 that are disposed on the two sides of the locking turntable 5, to enable the buckles 501 to be inserted inside the groove, and the terminal device are rotated, to enable the buckles 501 to be staggered with the groove and clamped. When the buckles 501 are staggered with the groove, the anti-rotation plate 302 that is staggered with the groove is opposite to the buckles 501 while the groove rotates. When the user releases the buttons 6, the return spring 603 rebounds to drive the buttons 6 to be quickly reset, and the limiting spring 303 rebounds to drive the gear stand 3 to be quickly reset, to enable the gear stand 3 to drive the anti-rotation plate 302 to be inserted inside the groove. This prevents the terminal device from rotating on the locking plate and ensures the stability of the connection of the terminal device.

In conclusion, according to the fixed quick-release apparatus, the locking turntable 5 is connected to the terminal device in the snap-fit manner. Therefore, the terminal device that is connected in the rotary snap-fit manner is further limited with the anti-rotation plate 302. In comparison with a single snap-fit manner and a magnetic fixation manner, the terminal device is fastened by using the anti-rotation plate 302 with the locking turntable 5. Therefore, the terminal device is more stable and better protected in use, and does not fall off.

According to the fixed quick-release apparatus, because the gear stand 3 is driven to move by pressing the button 6, the positioning gear ring 301 is engaged with the limiting gear ring 101, to limit rotation of the locking turntable 5 and the unlocking of the anti-rotation plate 302 on the terminal device. Therefore, the product can be quickly mounted and disassembled. Because the spring steel beads 103 abut against the arc-shaped groove 401, the terminal device can be adjusted and positioned by rotating 360°. Therefore, a user can adjust a placement angle of the terminal device in different scenarios. This better meets a use requirement of the user.

It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. In case there are no more restrictions, an element limited by the statement "including a . . ." does not exclude the presence of additional identical elements in the process, the method, the article, or the device that includes the element.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. A fixed quick-release apparatus, comprising:
   a gear turntable (1), configured to connect to a cycling bracket, wherein a limiting gear ring (101) is disposed on a top circle of the gear turntable (1);
   a housing (2), configured to mount the gear turntable (1);
   a gear stand (3), mounted inside the housing (2), wherein a positioning gear ring (301) that is opposite to the limiting gear ring (101) is disposed on a bottom circle of the gear stand (3), and an anti-rotation plate (302) is disposed at a top of the gear stand (3);
   a limiting spring (303), disposed at a bottom of the gear stand (3), and configured to control a clearance between the positioning gear ring (301) and the limiting gear ring (101), to enable the positioning gear ring (301) to rotate 360° relative to the limiting gear ring (101);
   a lower housing (4), embedded in a bottom of the housing (2);
   a locking turntable (5), configured to connect to an electronic device, wherein a top end of the anti-rotation plate (302) penetrates through the lower housing (4) and extends to a side of the locking turntable (5), to limit relative rotation between the locking turntable (5) and the electronic device; and
   at least two buttons (6), wherein one end of the button (6) extends inside the housing (2) and is in contact with the top of the gear stand (3), and the button (6) is pressed to abut against the gear stand (3), to enable the positioning gear ring (301) to be engaged with the limiting gear ring (101), and in addition, the top end of the anti-rotation plate (302) retracts inside the lower housing (4) while the gear stand (3) moves down.

2. The fixed quick-release apparatus according to claim 1, wherein a connection base (102) is disposed inside the gear turntable (1), at least four spring steel beads (103) are disposed inside the connection base (102), a bottom of the lower housing (4) is provided with a circle of arc-shaped groove (401), the arc-shaped groove (401), the gear turntable (1), the gear stand (3), and the locking turntable (5) are coaxially disposed, and one end of the spring steel bead (103) abuts against an inner wall of the arc-shaped groove (401).

3. The fixed quick-release apparatus according to claim 2, wherein a nut (104) is embedded inside the connection base (102), an assembly groove (105) is provided at a bottom of the gear turntable (1), and a through hole (106) that is coaxially opposite to the nut (104) is provided in the assembly groove (105).

4. The fixed quick-release apparatus according to claim 1, wherein two buckles (501) that are mutually symmetrical protrude from an outer ring of the locking turntable (5), the anti-rotation plate (302) is located on a rotating path of the buckle (501), the anti-rotation plate (302) is arc-shaped, and a damping ring (502) is disposed at a top of the locking turntable (5).

5. The fixed quick-release apparatus according to claim 3, wherein a limiting cardboard (504) that is located on two sides of the stud II (503) is disposed at a bottom of the locking turntable (5), a bottom end of the limiting cardboard (504) is stuck inside the lower housing (4), and at least one anti-slip strip (505) is disposed at a bottom of the buckle (501).

6. The fixed quick-release apparatus according to claim 1, wherein a diameter of the gear stand (3) is larger than a diameter of the gear turntable (1), at least one connecting column (304) is disposed at a circle of the gear stand (3), a quantity of limiting springs (303) is not less than one, and the plurality of limiting springs (303) are respectively sleeved on a plurality of connecting columns (304), a limiting groove (201) is disposed at a bottom of an inner wall of the housing (2), and one end, away from the connecting column (304), of the limiting spring (303) extends inside the limiting groove (201).

7. The fixed quick-release apparatus according to claim 1, wherein a movable groove (601) and a beveled edge portion (602) are respectively disposed at a top and a bottom of one end, extending inside the housing (2), of the button (6), a slant block (305) that is in contact with the beveled edge portion (602) is disposed at the top of the gear stand (3), and the beveled edge portion (602) is internally provided with a kidney-shaped hole (7), and a screw (8) of which one end is screwed inside the lower housing (4) is disposed inside the kidney-shaped hole (7).

8. The fixed quick-release apparatus according to claim 5, wherein a return spring (603) is movably sleeved inside the movable groove (601), a limiting base (202) is disposed on the bottom of the inner wall of the housing (2), and one end, away from the movable groove (601), of the return spring (603) extends inside the limiting base (202).

9. The fixed quick-release apparatus according to claim 1, wherein two arc-shaped stabilizing plates (402) are symmetrically disposed at a bottom of the lower housing (4), and bottom ends of the arc-shaped stabilizing plates (402) extend inside the gear stand (3).

10. The fixed quick-release apparatus according to claim 1, wherein a stud I (403) that is located between two arc-shaped stabilizing plates (402) is disposed at a bottom of the lower housing (4), a stud II (503) that extends inside of the stud I (403) is disposed at a bottom of the locking turntable (5), and a turntable locking screw (404) of which one end is screwed into the stud II (503) is disposed inside the stud I (403).

* * * * *